United States Patent
Schoenmakers et al.

[19]

[11] Patent Number: 5,880,888
[45] Date of Patent: *Mar. 9, 1999

[54] HELMET MOUNTED DISPLAY SYSTEM

[75] Inventors: Wayne P. Schoenmakers, Winnetka, Ill.; Donald J. Rotier, St. Paul, Minn.

[73] Assignee: Hughes Aircraft Company, Los Angeles, Calif.

[ * ] Notice: The terminal 44 months of this patent has been disclaimed.

[21] Appl. No.: 300,446

[22] Filed: Jan. 23, 1989

[51] Int. Cl.$^6$ .................................................. G02B 27/14
[52] U.S. Cl. ........................... 359/631; 359/629; 359/630
[58] Field of Search ................... 350/3.7, 3.72, 350/3.65, 538, 557, 503, 547, 172–174; 340/705, 980; 359/618–640

[56] References Cited

U.S. PATENT DOCUMENTS

| | | | |
|---|---|---|---|
| 3,737,212 | 6/1973 | Antonson et al. | 350/3.72 |
| 4,081,209 | 3/1978 | Heller et al. | 350/174 |
| 4,218,111 | 8/1980 | Withrington et al. | 350/174 |
| 4,468,101 | 8/1984 | Ellis | 350/174 |
| 4,563,061 | 1/1986 | Ellis | 350/174 |
| 4,613,200 | 9/1986 | Hartman | 350/174 |
| 4,653,879 | 3/1987 | Filipovich | 350/538 |
| 4,711,512 | 12/1987 | Upatnieks | 350/174 |
| 4,729,634 | 3/1988 | Raber | 350/174 |
| 4,761,056 | 8/1988 | Evans et al. | 350/174 |
| 4,763,990 | 8/1988 | Wood | 350/3.72 |
| 4,830,464 | 5/1989 | Cheysson et al. | 350/174 |

OTHER PUBLICATIONS

SPIE, Display System Optics, vol. 778 (1987) "An Integral Approach to Helmet Display System Design" pp. 83–88 Melzoc et al.

*Primary Examiner*—Bruce Y. Arnold
*Assistant Examiner*—Thong Nguyen
*Attorney, Agent, or Firm*—Michael W. Sales; Wanda K. Denson-Low

[57] ABSTRACT

An apparatus for combining a display image with the field of view of a viewer. Light from either a night vision system (14) of a CRT (12) is directed into an eyepiece assembly (18). The eyepiece magnifies and focuses the image into a combiner (30). The combiner (30) consists of an elongated optical element with two parallel sides (36) and (38) and two concave reflective surfaces (32) and (34) at each end. Light entering the combiner (30) is reflected off the first reflective surface (32) and then is reflected back and forth between the sides of the combiner (36) and (38) and then onto the second reflective surface (32). Light reflected off the second reflective surface (32) is combined with light entering from the field of view of the viewer through a prism element (44). The result is that the display image is superimposed in the field of view of the viewer. The system is light in weight, does not protrude significantly from the user's head, introduces minimal distortion and offers a wide field view.

13 Claims, 2 Drawing Sheets

HELMET MOUNTED DISPLAY SYSTEM

BACKGROUND OF THE INVENTION

1. Technical Field

The present invention relates to head up displays (HUD) and more particularly to head or helmet mounted HUD systems.

2. Discussion

HUD systems are commonly used in aircraft or other vehicles to display information, such as images of instruments in the field of view of a pilot or operator. Examples of such systems are described in U.S. Pat. Nos. 3,737,212 and 4,218,111. In U.S. Pat. No. 4,613,200 a HUD system employs holographic elements to project an image of an instrument into the viewer's field of view as the viewer looks through the forward window of a vehicle. In HUD systems the display apparatus may either be attached to the aircraft or vehicle or to the user's head or helmet.

Also related to the present invention are night vision goggle systems. These systems permit vision under very low light conditions by intensifying incoming infrared and/or visible light from a viewed object and converting it to intensified visible light. Night vision goggles transmit an electronically processed image into the viewer's field of view. Night vision goggles are normally attached to the viewer's head or helmet. This is done because when the viewer moves his head it is desirable to have the viewing axis of the night vision system correspond to the viewing axis of the viewer's eye.

Night vision goggles and viewing systems are described in U.S. Pat. Nos. 4,563,061, 4,468,101 and 4,653,879. There are a number of problems with such systems. Typically they are heavy, cumbersome and unstable. The length and weight of such systems can make them unsuitable in applications where the viewer's head is subjected to high gravitational or centrifugal loads, such as in high performance aircraft.

Further, because such systems often protrude a considerable distance in front of the viewer's eye they can present a clearance problem during an emergency pilot ejection. Another disadvantage is that the optical components in most prior systems invert the image. This necessitates additional optical components to re-invert the image, and the result is added weight, an increase in length, and a forward shift of the system's center of gravity.

Another disadvantage with night vision systems is that they give the user a limited field of view, with little or no peripheral vision. This renders such systems essentially useless for applications requiring peripheral vision.

Finally, both HUD's and prior night vision systems frequently introduce aberrations into the image. These include coma, chromatic aberration, and astigmatism.

Accordingly, it would be desirable to provide a head or helmet mounted display system which is light, does not protrude significantly away from the head, has a relatively wide field of view and provides a non-inverted image with minimal aberrations.

Also, it would be desirable to provide a helmet mounted display system which can be used to display information from a cathode ray tube (CRT) or can be used to display the output of a night vision system, and which would enable the user to switch from one display to the other.

SUMMARY OF THE INVENTION

The invention is directed to an improved head or helmet mounted display system which avoids the disadvantages of prior HUD and night vision systems while affording additional structural and operating advantages.

It includes a means for receiving the information image from a CRT and the output of a night vision device. An eyepiece then magnifies and collimates the light entering a combiner. The combiner permits a clear view of the scene in front of the user and also combines this view with the information display image.

The combiner comprises an elongated optical element with a curved reflective surface at either end. The combiner is the optical equivalent of two ellipsoidal solids. The reflective surfaces have a curved contour and are positioned at an angle with respect to the sides of the combiner. Light from the CRT or from the night vision system, enters the combiner after being magnified by the eyepiece. Within the combiner, light is reflected off the first reflective surface and is then reflected by total internal reflection back and forth between the sides of the combiner. Finally, the light reaches the second reflective surface. The light path then coincides with the light path from the scene in front of the viewer. The combined images are then directed toward the viewer's eye through an exit pupil.

An advantage of having a combiner with curved optical surface contours is that it permits a wide field of view, while folding the optical path to a more compact size. In addition, the combiner saves weight by avoiding the use of many separate optical elements and their associated optical hardware. The result is a display system which is simple and light in weight, and does not protrude significantly from the user's head. It introduces minimal distortion into the image, offers a wide field of view and an erect image. Also, the user can select either the CRT display mode or the night vision display mode at will.

DESCRIPTION OF THE PREFERRED EMBODIMENT

Figure 1:
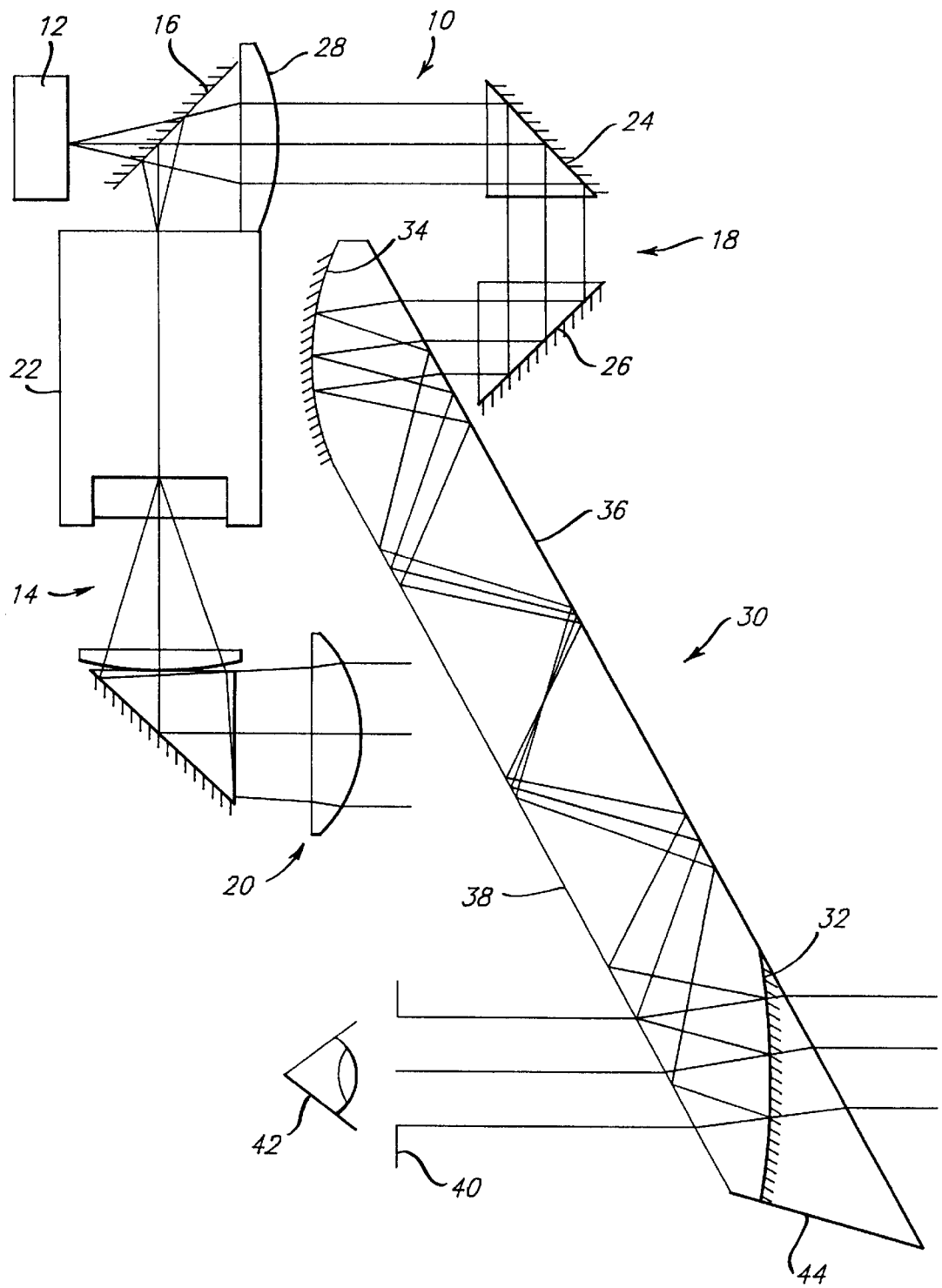
FIG. 1 is a schematic, side elevation view of a head or helmet mounted display system illustrating ray traces for directing and focusing on the light from a CRT or night vision system to the eye of a viewer.

Referring now to the drawings in more detail, FIG. 1 schematically illustrates the helmet mounted display system 10 in which the output of either a CRT or night vision system is directed and faced toward the eye of the viewer. In one embodiment, this display may be a CRT 12 containing an information display image from instruments of an aircraft or containing an image from a remote sensor such as a forward looking infrared system (FLIR). In addition, the display image may be the output of a night vision system 14. With the night vision system 14 turned off, no light is emitted from the night vision system 14, and only light from the CRT 12 passes through beam splitter 16 and into the eyepiece 18.

Alternatively, when the CRT 12 is turned off and the night vision system 14 is turned on, no light is emitted from the CRT 12 and only light from the night vision system 14 enters the eyepiece 18. When the night vision system is active, infrared and visible light from the user's field of view enter an imaging lens assembly 20 which focuses the incoming light onto the input surface of a conventional image intensifier 22.

As will be appreciated, an image intensifier 22 is a device in which light energy is converted into an electron beam that is then amplified. The amplified electron beam then is converted back into light. The result is a significant increase in the intensity of the light. The incoming light may consist of infrared light and the resulting amplified light will be visible light. Thus, the image intensifier 22 can also perform the function of converting infrared light into visible light.

The amplified visible light leaves the image intensifier 22 and is reflected off beam splitter 16 into a compound magnifier type eyepiece 18 and then into a combiner 30. The eyepiece 18 is a multi-element assembly with a large back focal distance. The purpose of the large back focal distance is to provide room for a beam splitting component that permits a path to the CRT 12 or to the image intensifier 22 output surface. The back focal distance of the magnifier type eyepiece 18 will permit inclusion of a beamsplitter or reflector. The magnifier eyepiece 18 comprises two fold mirrors 24 and 26 and a lens assembly 28.

The purpose of the eyepiece lens assembly 28 is to magnify the image. In brief, the magnifier eyepiece 18 performs two primary functions, it magnifies the image, and it folds the light so that the light entering it is turned in the opposite direction.

Figure 2:
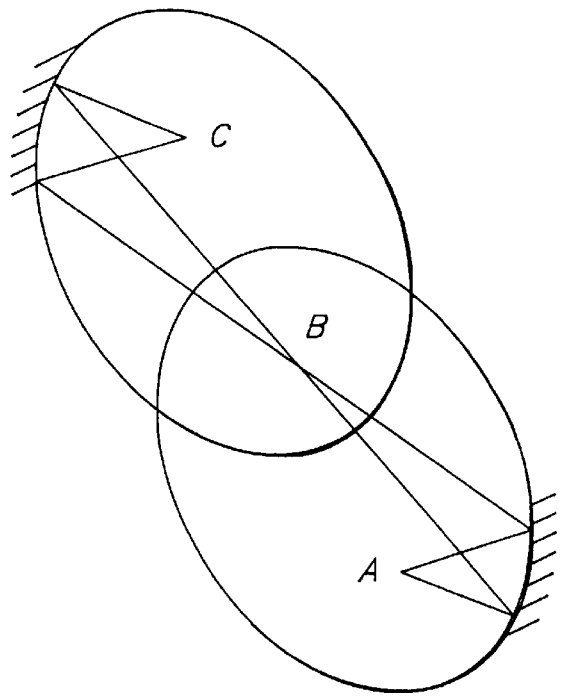
FIG. 2 is a perspective drawing of two ellipsoidal solids which define the curved shapes of the two combiner reflective surfaces and indicating ray traces.

Light leaving the magnifying eyepiece then enters the combiner 30. The combiner 30 functions optically as a pair of elliptical reflectors. Referring now to FIG. 2, a schematic of two elliptical reflectors having one focus in common is shown to illustrate their function. A unique characteristic of an elliptical reflector is that light originating at one focus of the ellipse will be reflected by the inside surface of the ellipse and will then be directed to the second focus. Points A and B represent the first and second foci of one ellipse, while points B and C represent the foci of the second ellipse. Ray traces illustrate the path of light originating at A, passing through B, and on to C.

While the drawing indicated, two, two-dimensional ellipses, the above optical characteristics are also present for two, three-dimensional ellipsoidal solids. Such forms would have the general appearance of eggs. Thus, for an ellipse in any plane passing through point A and B, with points A and B being the foci of the ellipse, light originating at A will be brought to a focus initially at B, and subsequently at C.

Figure 3:
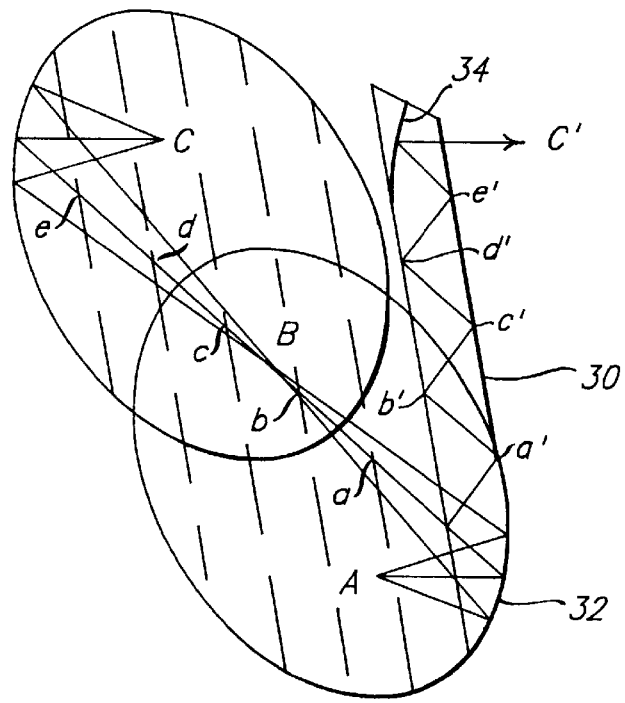
FIG. 3 is a drawing of the ellipsoidal solids indicating ray traces and also showing the equivalent ray traces within the combiner element.

The combiner 30 functions essentially as an ellipsoidal solid, as shown in FIG. 3. Combiner 30 is an optically clear elongated solid having two curved reflective surfaces 32 and 34 at either end. The reflective surfaces 32 and 34 are positioned at an angle with respect to the long parallel sides 36 and 38. In FIG. 3, the combiner is superimposed on a drawing of the elliptical reflector to illustrate that the combiner 30 performs the same optical functions as an elliptical reflector. Thus, all light originating at point A will end up at point C. Likewise, essentially all the light originating at point A traveling through the combiner 30 will end up at point C. In the present invention, point A will be where the image is to be displayed occurs. Point C is where the viewer's eye will be.

In more detail, light originating at point A in FIG. 3 will travel toward the side of the lower ellipse. The reflective surface 32 is superimposed directly over a segment of the ellipse and has the same general shape. Upon reflecting off the wall of the ellipse, light will travel in a straight line through the common focus to the opposite wall of the upper ellipse. In the combiner 30 this ray of light will be totally internally reflected by the wall of the combiner 30 the same total distance as it would be in the ellipse. The light will then be reflected by the second reflective surface 34. The second reflective surface 34 has the same general shape as the corresponding portion of the wall of the ellipse. Accordingly, the light in the combiner 30 will be reflected to point C.

To illustrate the equivalence of the light path inside the combiner 30 with the light path inside the ellipse, points a, b, c, d, and e, are shown which correspond to points along the path of a ray of light traveling inside the ellipses from point A to point C. Likewise, a', b', c', d', and e' are equally distant points, along the light path in the combiner 30.

It will be appreciated that the path of light shown within the combiner 30 will be the same as in two ellipsoidal solids, except that the edges of the combiner 30 will limit the field of view at point C' of the image at point A. In other words, the field of view at C in an ellipsoidal solid is unlimited in any direction. In the present invention, due to limitation in the size of the combiner element, the field of view is limited to about 30 degrees. Referring now to FIGS. 1 and 3, light images originate at either the CRT 12 or the output surface of the image intensifier 22. Those points correspond to the image source at point A in FIG. 3. After passing through the eyepiece 18, these images enter the combiner 30 are reflected off the first reflective surface 34, the parallel surfaces 36 and 38, and then off the second reflective surface 32. The light is then directed through exit pupil 40 to a point at the viewer's eye 42. It will be appreciated that curved reflective surfaces 32 and 34 also may take the shape of confocal parabolic surfaces. Reflections from parallel surfaces 36 and 38 again are used to redirect the light path between curved reflective surfaces 32 and 34.

Combiner 30 also includes prism element 44. Prism element 44 receives light from the field of view in front of the viewer and combines this light with the display image. Combining of the two images is possible because the second reflective surface 32 is only partially reflective so that it acts like a beamsplitter. It reflects the display image passing through the combiner 30 and also permits transmission of the light entering the prism element 44. It is important that the portion of the combiner 30 in front of the viewer's field of view, including the second reflective surface 32, the parallel side 38 and the prism element 44 are all substantially transparent to provide the viewer an unobstructed field of view. Of critical importance are the thickness and tilt of the combiner with respect to the eye axis.

The combiner 30 does introduce astigmatism into the image. This occurs because the reflective surfaces are tilted with respect to the optical axis. One way in which this may be corrected is by giving one or both of the first and second reflective surfaces 32 and 34 a somewhat toroidal shape, in addition to the previously discussed ellipsoidal shape. This means that the first and second reflective surfaces may be different from each other and may have different cross-section horizontal and vertical projections. The correct toroidal contour will eliminate astigmatism in the resulting image.

A further consideration is that the optical components of the display system 10 will change the left/right and the up/down orientation of the display image. The number of times the optical path inside the combiner 30 strikes the two parallel sides 36, 38 will determine the orientation and the location of the resulting image. Accordingly, the design of the combiner 30, specifically the thickness and length of the combiner and the angular tilt of the reflective surfaces, permits a convenient way to achieve the proper orientation of the resulting image.

A further advantage of this display system 10 is that because of the wide field of view afforded by the combiner 30, it provides an exit pupil 40 that is many times larger than the eye 42 pupil. Thus, the positioning of the eye pupil is not as critical as it would otherwise be. This is important because in a head-mounted display, achieving the proper position of the eye is critical, because the eye cannot easily be repositioned with respect to the lens system after its position is altered, for example, by a quick motion of the head or helmet. Because the present system has a large exit pupil, the exit pupil is vignetted by structural components, not by a fixed aperture stop to be imaged at the eye of the observer. For example, the exit pupil 40 in the present system may be 12 mm in diameter for a 30° field of view; or the exit pupil 40 may be 14.5 mm in diameter for a 25° field of view.

Another advantage of the display system 10 is that the large exit pupil permits the use of auxiliary lenses, such as the viewer's own glasses. In previous systems with a small viewing angle, the system would have to incorporate means for large dioptric adjustments to accommodate the individual viewer's visual requirements.

It will be appreciated that the helmet mounted display system 10 may also be used in a binocular system. In such an arrangement, two substantially identical display systems 10 are used to display information to each eye of the viewer. Those skilled in the art will come to appreciate that other advantages and modifications of the particular examples set forth herein are obtainable without departing from the spirit of the invention as defined in the following claims.

What is claimed is:

1. A head or helmet mounted display system comprising:
    an exit pupil positioned to receive a scene in the field of view of a viewer;
    display means for producing an optical display image;
    an eyepiece lens assembly for receiving and magnifying the optical display image;
    beam combiner means for receiving and relaying the display image from the eyepiece lens assembly and for superimposing and combining the display image with said scene being viewed by the viewer;
    an elongated optical element included in said beam combiner means containing two parallel reflecting surfaces and having a curved reflective surface at one end and having a second curved reflective surface at the opposite end, these curved reflective surfaces having contours that are convex to the outside of the beam combiner means, the reflective surfaces having confocal foci inside said elongated optical element, the reflecting surfaces also being positioned at an angle with respect to the parallel surfaces, wherein the display image entering the elongated optical element is reflected by a first reflective surface onto one parallel side, and then back and forth between the two parallel sides at least twice, and then onto the second reflective surface, whereupon the display image is directed out of the elongated optical element along an optical path toward the exit pupil; and
    an input means included in the beam combiner means for receiving light from the scene being viewed by the viewer and also for directing this received light along an optical path coincident with said optical path of the light reflected from the second reflective surface, so that the scene image is superimposed onto the display image and both images are directed out of the combiner and into the exit pupil, whereby the optical display image is superimposed on the scene within the viewer's field of view.

2. The system of claim 1 further including a night vision system comprising:
    an imaging lens assembly for receiving light from the field of view of the viewer;
    an image intensifier for amplifying light from the imaging lens assembly; and
    a beam splitter for directing the amplified light into the eyepiece lens assembly, whereby either the light from the night vision system or from the display means is directed to the exit pupil.

3. The system of claim 2 wherein said eyepiece lens assembly has a focal length equal to the distance of the optical path from the image intensifier output to said eyepiece lens assembly.

4. The system of claim 1 wherein the display means is a CRT.

5. The system of claim 1 wherein the display means is a forward looking infrared system.

6. The system of claim 1 wherein the curved contours of the first and second reflective surfaces define portions on the surfaces of two confocal ellipsoidal solids and the foci of the first and second reflective surfaces correspond to the foci of the ellipsoidal solids.

7. The system of claim 6 wherein the curved contours further define a toroidal shape in addition to the ellipsoidal shape for correcting astigmatism introduced into the display image by the combiner.

8. The system of claim 1 wherein the exit pupil is at least 14.5 millimeters in diameter and the field of view is at least 25 degrees.

9. An optical component for viewing a field from a remote position comprising:
    an elongated transparent body enclosed by two flat parallel surfaces and by a first and a second curved reflective surface; and
    the first and second curved reflective surfaces being spaced apart at a distance such that they have common points of focus, said reflective surfaces defining confocal surfaces of two adjacent ellipsoidal solids having confocal foci such said confocal foci are inside said elongated transparent body, the two reflective surfaces being arranged so that a light ray reflected from one surface to the other is contained in a plane which is perpendicular to the two parallel surfaces, both reflective surfaces being at angles to the parallel surfaces.

10. The optical component of claim 9 wherein the foci of the first and second reflective surfaces correspond to the foci of said ellipsoidal solids.

11. A head or helmet mounted display system comprising:
    an exit pupil positioned to receive a scene in the field of view of the viewer;
    an eyepiece lens assembly for receiving and magnifying the optical display image;
    a beam combiner for receiving and focusing the display image from the eyepiece lens assembly and for superimposing and combining the display image with said scene being viewed by the viewer;
    an elongated optical element included in said beam combiner containing two parallel reflective surfaces and having a curved reflective surface at one end and having a second curved reflective surface at the opposite end, these reflective surfaces having curved contours that are convex to the outside of the beam combiner and which are defined by the surfaces of two confocal ellipsoidal solids, the reflective surfaces having confocal foci inside said elongated optical element, the reflecting surfaces also being positioned at an angle with respect to the parallel surfaces, wherein the display image entering the elongated optical element is reflected by the first reflective surface onto one parallel side and thence by total internal reflection to the other parallel sides at least twice, and then onto the second reflective surface, whereupon the display image is directed out of the elongated optical element and is directed along an optical path toward the exit pupil; and an input means included in the beam combiner for receiving light from the scene being viewed by the viewer and also for directing this received light along an optical path coincident with said optical path of the light reflected from the second reflective surface, so that the scene image is superimposed onto the display image and both images are directed out of the combiner and into the exit pupil, whereby the optical display image with a field of view about 30° is superimposed on the scene within the viewer's field of view.

12. An optical system of collimation comprising, in series: a source of images to provide a light radiation, a collimation objective to collimate the radiation, a combiner comprising a confocal assembly with a first parabolic mirror and a second parabolic mirror and a transparent plate, the first mirror being reflective to reflect the collimated radiation towards the second mirror, and the second mirror being partially transparent to enable, simultaneously, the transmission by reflection, towards an observer, of the radiation received from the first mirror, and the transmission by transparency, towards the observer, of an external radiation, the transparent plate having two ends, a first face and a second face which are parallel, the two ends being formed, respectively, by the two parabolic mirrors, and wherein an optical path of the collimated radiation between the objective and the observer comprises, subsequently, a first crossing of one of the two parallel faces, a reflection on the first mirror, several total reflections on the parallel faces, a reflection on the second mirror and a second crossing of one of the two parallel faces.

13. An optical system of collimation comprising, in series: a source of images to provide a light radiation, a collimation objective to collimate the radiation, a combiner comprising a confocal assembly with a first curved reflective surface and a second curved reflective surface and a transparent plate, the first curved reflective surface being reflective to reflect the collimated radiation towards the second curved reflective surface, and the second curved reflective surface being partially transparent to enable, simultaneously, the transmission by reflection, towards an observer, of the radiation received from the first curved reflective surface, and the transmission by transparency, towards the observer, of an external radiation, the transparent plate having two ends, a first face and a second face which are parallel, the two ends being formed, respectively, by the two curved reflective surfaces, and wherein an optical path of the collimated radiation between the objective and the observer comprises, subsequently, a first crossing of one of the two parallel faces, a reflection on the first curved reflective surface, several total reflections on the parallel faces, a reflection on the second curved reflective surface and a second crossing of one of the two parallel faces.

* * * * *